US012524750B2

(12) United States Patent
Sellers et al.

(10) Patent No.: US 12,524,750 B2
(45) Date of Patent: Jan. 13, 2026

(54) INTEGRATED EVENT MANAGEMENT AND PEER-TO-PEER FINANCIAL PLATFORM

(71) Applicant: Quan, LLC, Fair Oaks, CA (US)

(72) Inventors: Joshua Sellers, Fair Oaks, CA (US); Nathan M. Sellers, Fair Oaks, CA (US)

(73) Assignee: Quan, LLC, Fair Oaks, CA (US)

( * ) Notice: Subject to any disclaimer, the term of this patent is extended or adjusted under 35 U.S.C. 154(b) by 0 days.

(21) Appl. No.: 18/886,150

(22) Filed: Sep. 16, 2024

(65) Prior Publication Data

US 2025/0104043 A1  Mar. 27, 2025

Related U.S. Application Data

(60) Provisional application No. 63/540,143, filed on Sep. 25, 2023.

(51) Int. Cl.
*G06Q 20/22* (2012.01)
*G06Q 20/04* (2012.01)

(52) U.S. Cl.
CPC ......... *G06Q 20/229* (2020.05); *G06Q 20/045* (2013.01); *G06Q 20/223* (2013.01)

(58) Field of Classification Search
CPC .. G06Q 20/229; G06Q 20/045; G06Q 20/384; G06Q 20/102; G06Q 20/223; G06Q 20/322
See application file for complete search history.

(56) References Cited

U.S. PATENT DOCUMENTS

| | | | | |
|---|---|---|---|---|
| 7,571,136 | B2* | 8/2009 | May | G06Q 40/08 705/37 |
| 8,600,866 | B2* | 12/2013 | Chiulli | G06Q 40/06 705/37 |
| 9,180,362 | B2* | 11/2015 | Herrman | G07F 17/32 |
| 9,767,711 | B2* | 9/2017 | Moumneh | G06V 40/172 |
| 10,346,918 | B2* | 7/2019 | Schmitt | G06Q 40/04 |
| 10,354,323 | B2* | 7/2019 | Adcock | G06Q 40/06 |
| 11,062,320 | B2* | 7/2021 | Trivedi | G06Q 20/3221 |
| 11,361,305 | B2* | 6/2022 | Jones | G06Q 20/202 |
| 2005/0266919 | A1 | 12/2005 | Rowe et al. | |
| 2009/0177582 | A1 | 7/2009 | Cucinotta | |
| 2012/0283005 | A1* | 11/2012 | Van Luchene | G07F 17/3281 463/25 |
| 2019/0080411 | A1* | 3/2019 | Pierce | G06Q 20/36 |

(Continued)

FOREIGN PATENT DOCUMENTS

KR  20240124524 A  *  2/2023  ..... G06Q 20/401145
WO  WO-2024197094 A2  *  9/2024

OTHER PUBLICATIONS

International Search Report and Written Opinion for PCT/US24/46879, dated Dec. 5, 2024, 9 pages.

*Primary Examiner* — Daniel S Felten
(74) *Attorney, Agent, or Firm* — Fennemore Craig, P.C.

(57) ABSTRACT

Systems and methods of event-based payment allocation are disclosed. An assigned primary user creates an event and designates participant users who are participants in the event. The primary user may also set parameters for the event, such as event cost, repayment terms, number of participants, and event duration. A payment request is transmitted to each participant user based at least on the event cost established by the primary user. Payments tendered by participant users are credited to the primary user.

24 Claims, 8 Drawing Sheets

(56) References Cited

U.S. PATENT DOCUMENTS

| | | | |
|---|---|---|---|
| 2019/0279244 A1* | 9/2019 | Postrel | G06Q 30/0239 |
| 2020/0364785 A1 | 11/2020 | Olson et al. | |
| 2020/0380535 A1* | 12/2020 | Gojkovic | G06Q 30/0224 |
| 2021/0074122 A1 | 3/2021 | Warner | |
| 2021/0201275 A1* | 7/2021 | Patel | G06Q 20/0855 |
| 2023/0046919 A1 | 2/2023 | Dhodapkar | |
| 2023/0055064 A1* | 2/2023 | Dalmia | G06Q 50/34 |
| 2023/0252470 A1* | 8/2023 | Dhodapkar | G06Q 20/229 705/44 |

\* cited by examiner

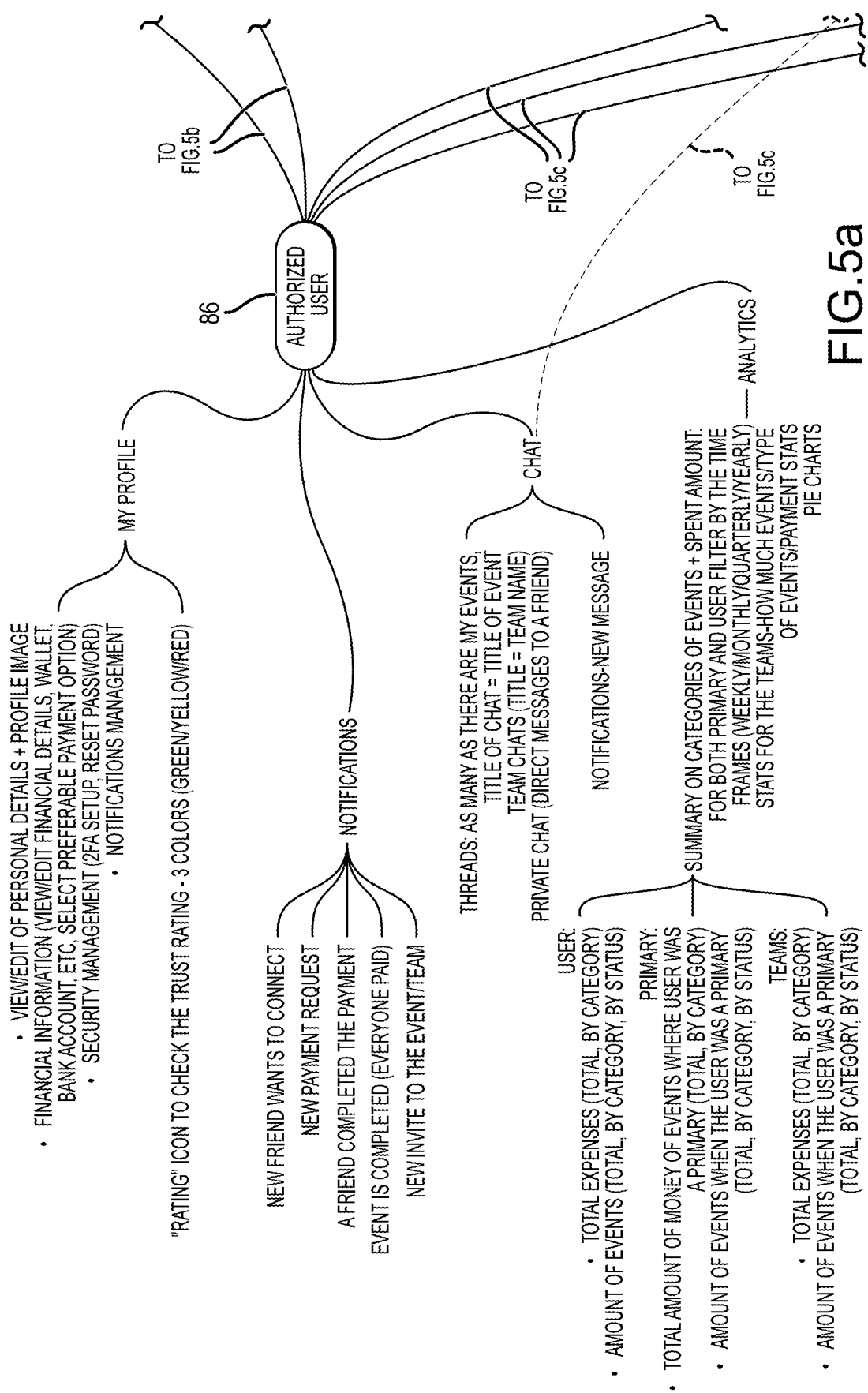

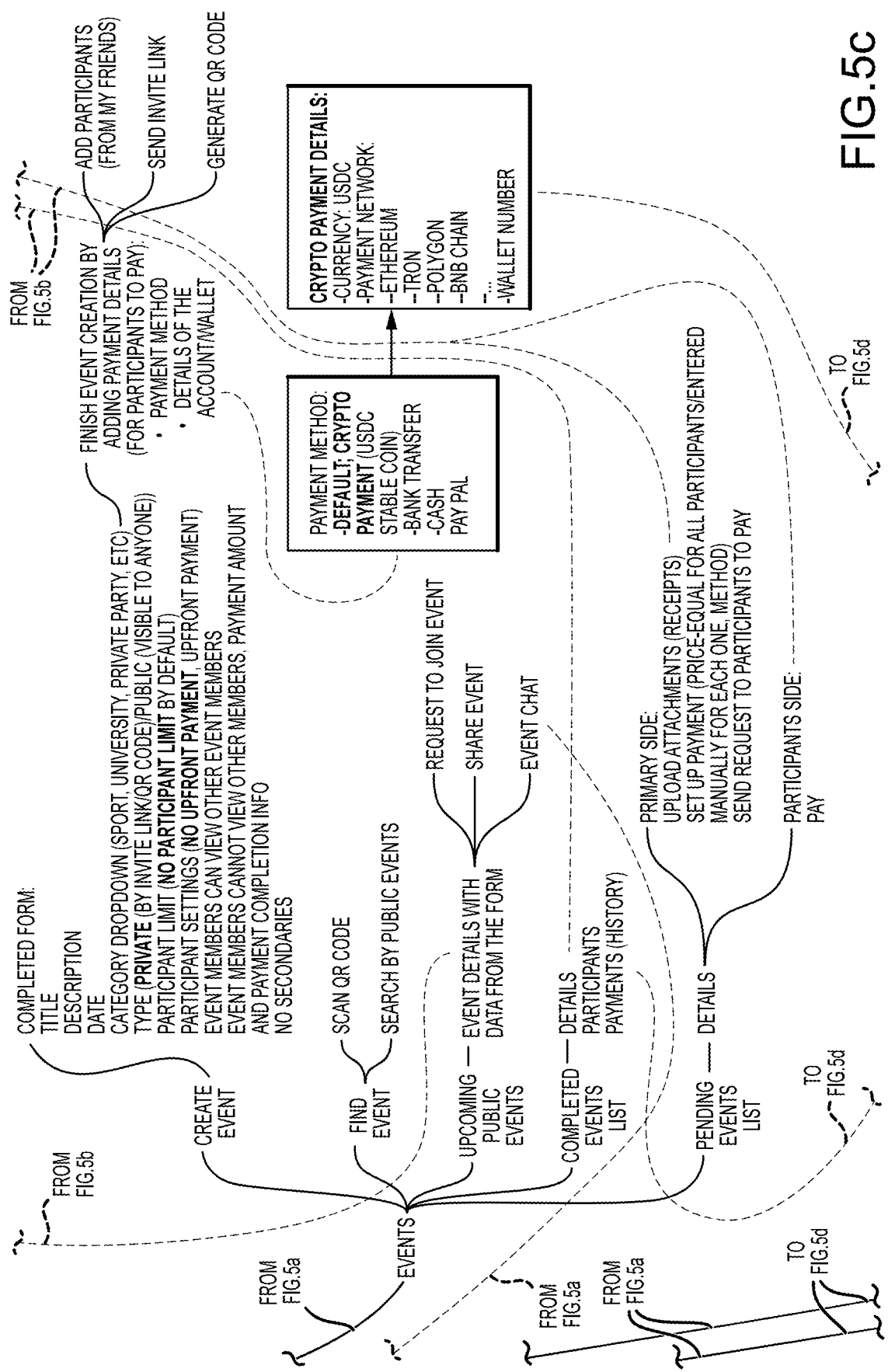

INTEGRATED EVENT MANAGEMENT AND PEER-TO-PEER FINANCIAL PLATFORM

CROSS-REFERENCE TO RELATED APPLICATION

This application claims the benefit of U.S. Provisional Patent Application No. 63/540,143, filed on Sep. 25, 2023, which is hereby incorporated herein by reference for all that it discloses.

TECHNICAL FIELD

The disclosed instrumentalities relate to payment transaction systems in general and more specifically to systems and methods for allocating event payments among multiple parties.

BACKGROUND

Mobile payment services, such as Venmo, Zelle, and PayPal, are well-known in the art and allow users to pay for any of a wide range of goods, services, events, or functions via their mobile devices or smart phones. While such mobile payment services may also be used in situations wherein costs associated with an event are desired to be split among a number of parties, it is still typically necessary for a single person or entity to make the initial payment for the event, then request payment from the other parties via the mobile payment service. In addition, it usually falls upon the person or entity making the initial payment to determine the appropriate share or allocation that is to be paid by the other parties. That person or entity must then inform the other parties of their allocated share and request payment. Thereafter, the person or entity that made the initial payment must keep track of those parties who have paid and remind those who haven't that payment still needs to be made. All-in-all, then, while such mobile payment services may be used to speed and streamline certain aspects of the payment process, they are not particularly well-suited for the management of payments among and between parties choosing to share in the cost of the event.

SUMMARY

One embodiment of an event-based payment processing system according to the disclosed instrumentalities may include an application server operatively associated with a network. At least some of a plurality of payment allocation applications provided on corresponding user communications devices of a plurality of users are in network communication with the application server. The application server and each of said plurality of payment allocation applications are provided with program instructions thereon that cause the payment processing system to: Assign as a primary user one of the plurality of users in response to signals transmitted by one of the user communications devices; create an event in response to event creation signals transmitted by the user communications device of the primary user; designate as participant users selected ones of others of the plurality of users in response to participant user designation signals transmitted by the user communications device of the primary user; transmit a payment request to the user communications device of each participant user based on event cost signals transmitted by the user communications device of the primary user; and receive a payment from at least one participant user, the payment being related to the transmitted payment request.

Also disclosed is a payment allocation method that includes: Operating a payment allocation application provided on a user communication device to cause the user communication device to transmit to an application server a request to be designated as a primary user; operating the payment allocation application on the user communication device to cause the user communication device to transmit to the application server a request to create an event; operating the payment allocation application on the user communication device to cause the user communication device to transmit to the application server a request to designate a plurality of participant users for the created event, the application server transmitting to the corresponding user communications device of each designated participant user an invitation to join the event; and operating the payment allocation application to cause the user communication device to transmit to the application server a cost related to the created event, the application server transmitting to the corresponding user communications device of each designated participant user a payment request related to the event cost.

Another disclosed method may include: Providing an application server operatively associated with a network; providing a plurality of payment allocation applications, the plurality of payment allocation applications being provided on corresponding user communications devices of a plurality of users; receiving at the application server, via a first payment allocation application provided on a first user communication device, a request by a user to be designated as a primary user; receiving at the application server, via the first payment allocation application, a request to create an event from the designated primary user; using the application server to generate data relating to the created event; receiving at the application server, via the first payment allocation application, designations of participant users; receiving at the application server, via the first payment allocation application, data relating to the cost of the created event; using the application server to transmit a payment request to the payment allocation application provided on the user communications device of each participant user based on the cost of the created event; and receiving at the application server payment from at least one participant user, the payment being related to the transmitted payment request.

BRIEF DESCRIPTION OF THE DRAWINGS

Illustrative and presently preferred exemplary embodiments of the disclosed instrumentalities are shown in the drawings in which.

DETAILED DESCRIPTION OF THE PREFERRED EMBODIMENTS

The following is a detailed description of exemplary embodiments that illustrate the principles of the disclosed instrumentalities. While the embodiments illustrate various aspects of the disclosed instrumentalities, the disclosed instrumentalities should not be regarded as limited to any particular embodiment or combination of features. The scope of the disclosed instrumentalities encompasses numerous alternatives, modifications and equivalents.

Figure 1:
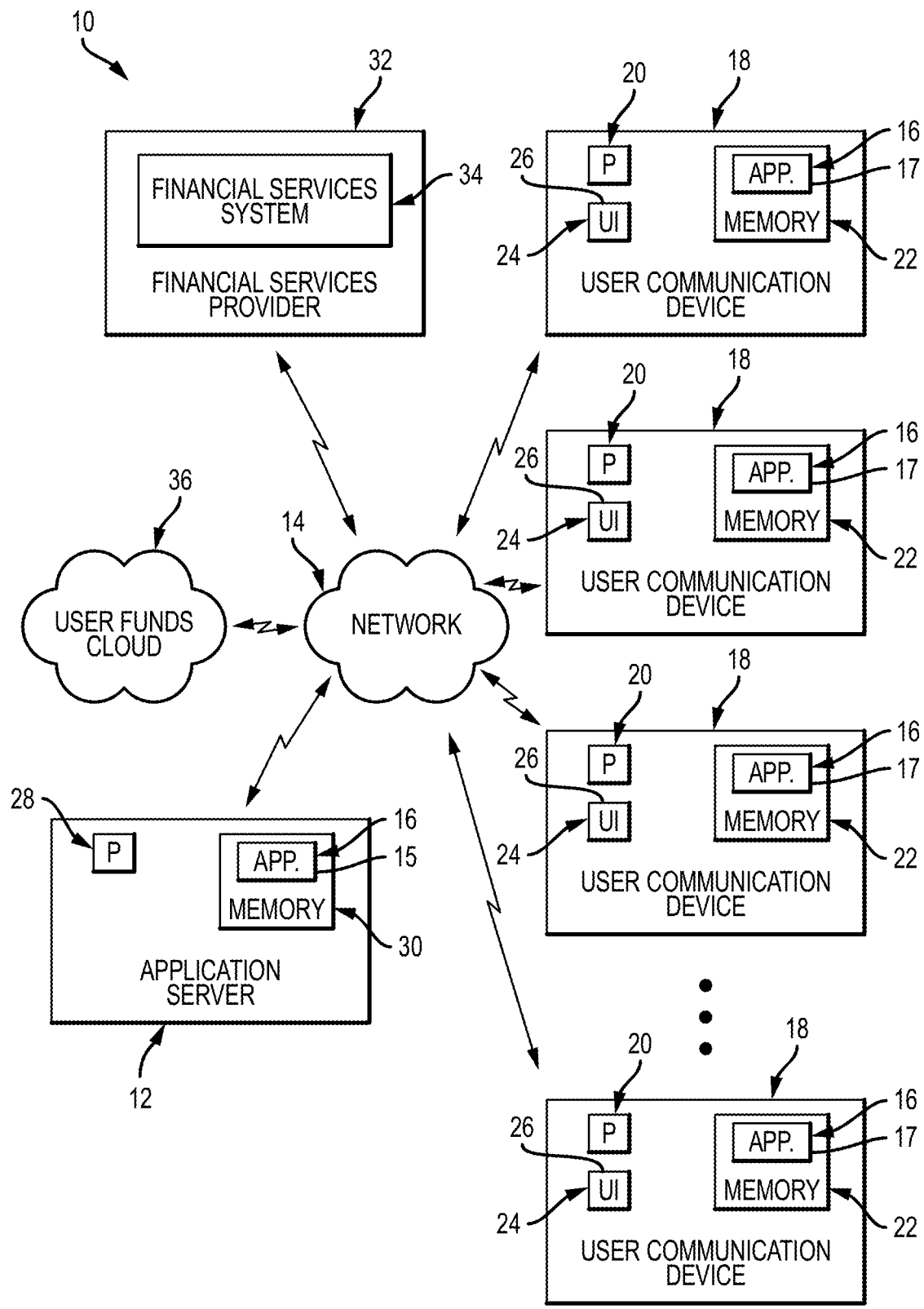
FIG. 1 is a schematic block diagram of one embodiment of a system according to the disclosed instrumentalities.

One embodiment of an event-based payment processing system 10 is illustrated in FIG. 1 and may comprise at least one application server 12 operatively associated with one or more networks 14, such as the Internet. System 10 may also include a payment allocation application 16. A portion of the payment allocation application 16, also referred to herein as an administrative portion 15, may be provided on application server(s) 12. Other portions, i.e., client or user portions 17, of the payment allocation application 16 may be provided on corresponding user communications devices 18 available to a plurality of users or parties.

Each user communications device 18 may include one or more processors 20, one or more memory systems 22, and one or more user interface systems 24, such as a touch screen display 26. The user portion 17 of payment allocation application 16 may be stored in memory system 22. User interface system 24 allows the user of user communications device 18 to interact or interface with payment allocation application 16 provided on application server 12. More specifically, and depending on the particular configuration of system 10, when launched or activated by the user, the user portion 17 of the payment allocation application 16 provided on the user communications device 18 may be operatively connected to the administrative portion 15 of payment allocation application 16 provided on application server 12.

System 10 may also be operatively associated with one or more financial services providers 32. In one aspect, financial service provider(s) 32 may include or be associated with one or more financial service systems 34 that may be configured to perform one or more aspects of the disclosed embodiments. For example, in some instances, financial service system(s) 34 may configure one or more accounts for a user of financial service provider(s) 32. The financial services provider(s) 32 may be used by the various users or parties of system payment transfers in accordance with the disclosed instrumentalities. Payments made via payment processing application 16 may be made in any currency, such as conventional currency or cryptocurrency.

In some embodiments, system 10 may also comprise one or more user funds 'clouds' 36. User fund cloud(s) 36 may be used to store user funds, thereby facilitating aspects of the financial transactions between and among the various users or parties to the system 10 and in accordance with the disclosed instrumentalities.

Figure 2:
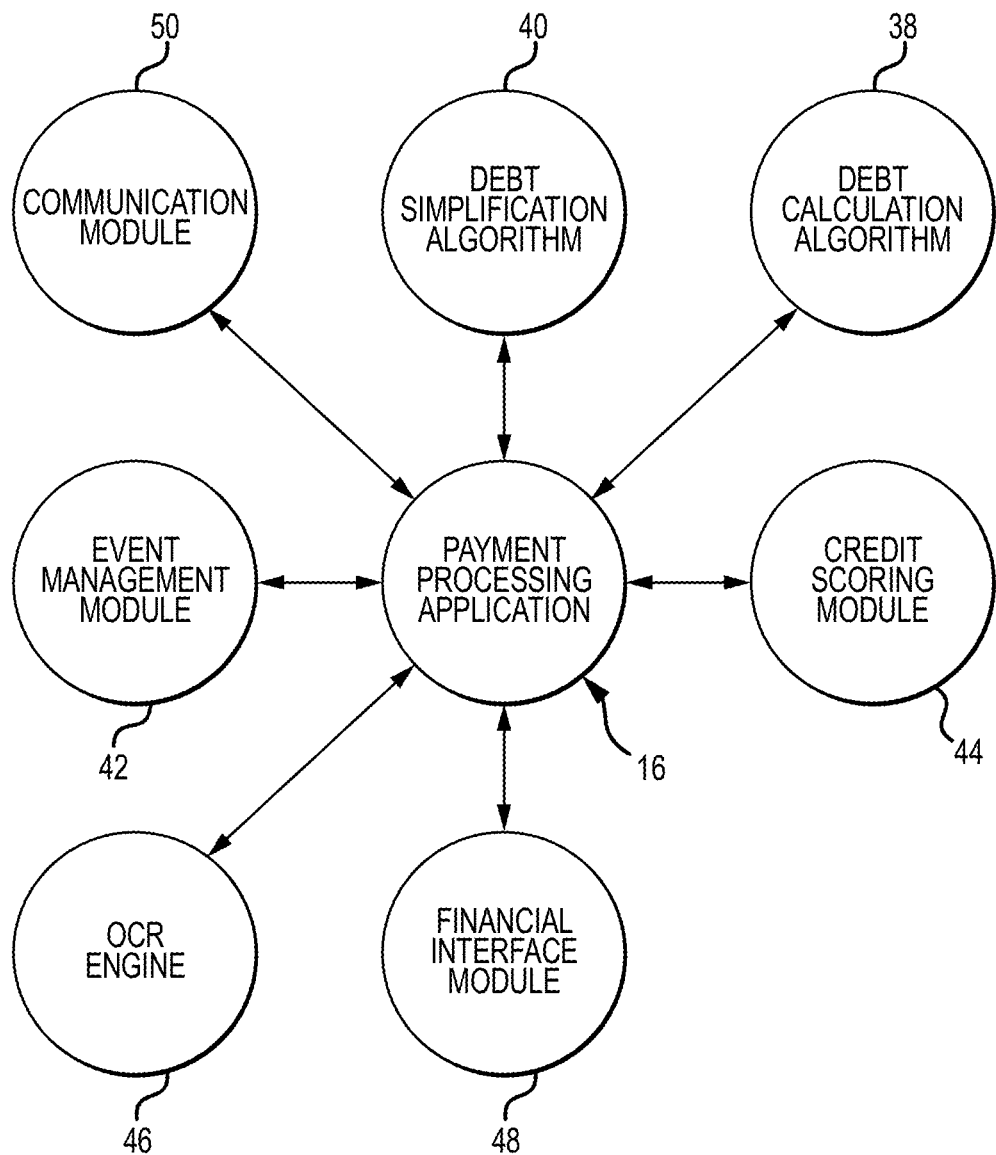
FIG. 2 is a schematic block diagram of one embodiment of the payment allocation application according to the disclosed instrumentalities.

Referring now primarily to FIG. 2, payment processing application 16 may include a plurality of algorithms, engines, and modules which may be implemented by payment processing application 16, either by administrative portion 15, user portion 17, or by combinations thereof. More specifically, and in the particular embodiments shown and described herein, payment processing application 16 may include a debt calculation algorithm 38 and a debt simplification algorithm 40. As will be described in much greater detail below, debt calculation algorithm 38 may be used to calculate net balances of users, thereby ensuring user payments are cross-referenced with user expenditures across all events. Debt simplification algorithm 40 may be used to calculate or determine the simplest way to settle debts among the participants, thereby minimizing the number of transactions.

Payment processing application 16 may also include an event management module 42. Event management module 42 manages events and sub-events created by the primary participant or user. A credit scoring module 44 may be used to calculate credit scores for the users, while an OCR (optical character recognition) engine 46 may be used to analyze electronic image data captured from physical media or documents having cost information provided thereon. In some embodiments, such electronic image data may comprise a QR code and OCR engine 46 may be responsive to the QR code. A financial interface module 48 allows payment allocation application 16 to interface with financial services provider(s) 32 and user funds cloud(s) 36. A communications module 50 allows payment allocation application to interface with the various user communications devices 18 and other systems connected to network(s) 14.

Figure 3:
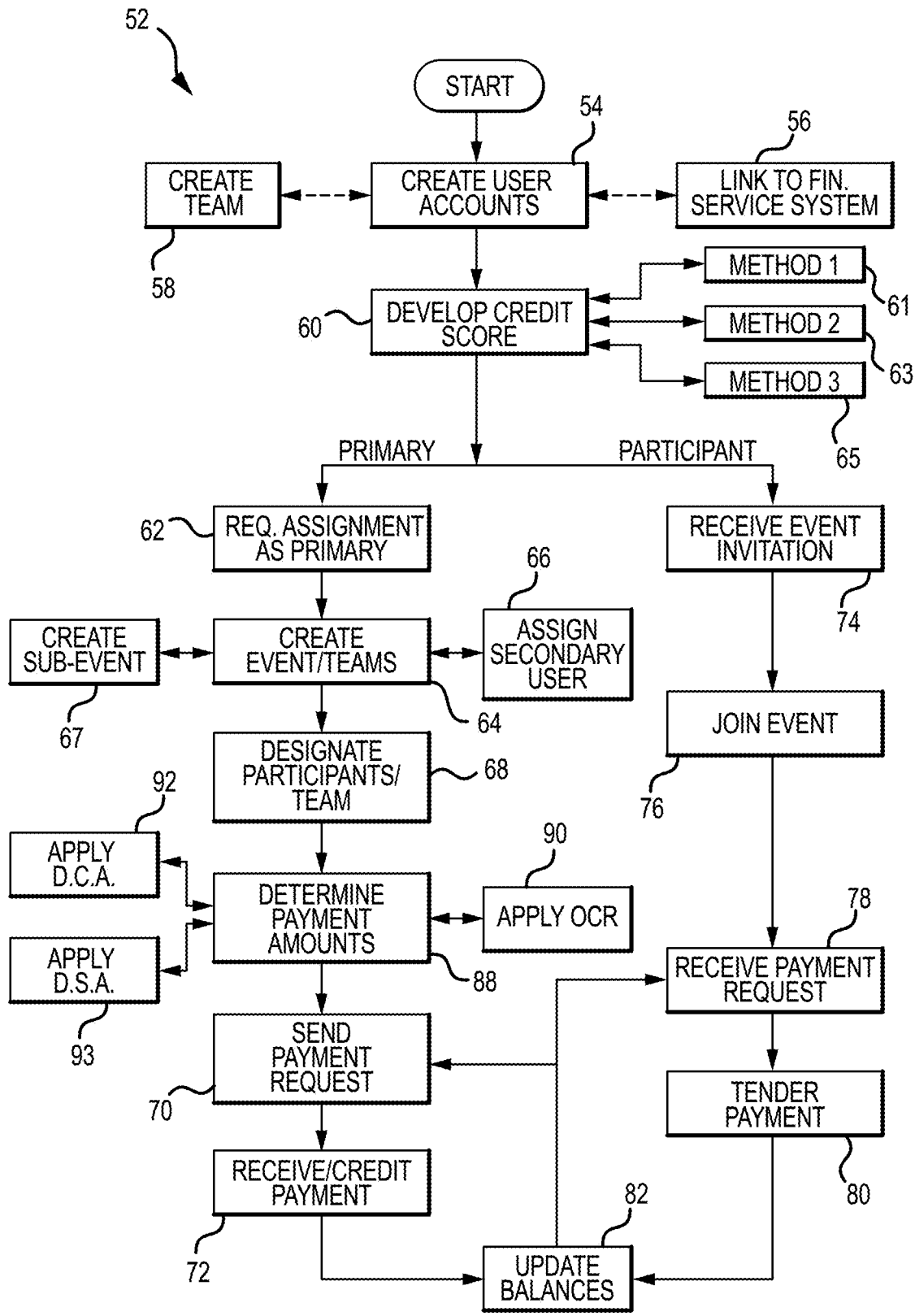
FIG. 3 is a flow chart representation of one embodiment of a method according to the disclosed instrumentalities.

Referring now to FIGS. 2 and 3 simultaneously, method 52 may involve at step 54 the creation of a user account. During step 54, system 10 may prompt the user (e.g., via the user interface 24 provided on the user communication device 18) to provide certain information and data required to create an account. In some embodiments, the user may also identify and link one or more financial services providers 32 to his or her user account at step 56. The link may be accomplished in whole or in part by financial interface module 48. So linking to a financial services provider(s) 32 facilitates the tender and receipt of payments via the system 10.

If desired, the user may also create one or more teams at step 58. Alternatively, a user may create a team at any time. In some embodiments, the system 10 may then develop a credit score for the user at step 60. The credit score may be developed in whole or in part by credit scoring module 44 and may be based at least in part on the personal and financial information provided by the user during the account creation step 54. Alternatively or in addition, and as will be described in greater detail below, payment processing application 12 may develop and/or revise the credit score on a periodic basis or after the user has interacted with system 10 as either a primary user or a participant user.

In any event, and after the user has created an account, the user may make a request at step 62 to be designated or assigned as a primary user. A primary user is a user that creates an event and bears the initial costs associated with the event. Upon receipt of the request, the system 10 would then assign as a primary user the user that made the request.

Having been designated as a primary user, i.e., at step 62, the system 10 would prompt the primary user to create an event at step 64. The creation and subsequent management of the event may be accomplished in whole or in part by event management module 42 (FIG. 2) of payment processing application 16. In order to create an event, the primary user would interface with payment allocation application 16, e.g., via user interface 24 of user communication device 18. When creating an event, the primary user may define the cost associated with the event (e.g., if the event cost is known at the time the event is created). The primary user may also elect to provide one or more payment terms for the event cost. In addition to the cost and payment terms of the event, the primary user may also provide additional information about the event, some of which are described herein and others of which will become apparent to persons having ordinary skill in the art after having become familiar with the teachings provided herein. By way of example, additional information about the event may include, but is not limited to, the event name, a description of the event, the date and time of the event, the event category (e.g., food, trips, rent, etc), whether the event is public or private, whether there is a limit to the number of participants, the participant visibility settings, and whether an initial or upfront payment is required.

Once the primary user has created the event, the primary user may, at step 68, designate participant users for the event. If the participant users in the event were previously defined as a team, the primary user may simply designate the team for the event. Then, each member of the team will be a participant user. If no team has yet been created for the designated participant users, then system 10 may allow the primary user to create a team for the event. After the participant users have been designated, the system 10 may then, at step 70, transmit or send payment requests to each designated participant user. Thereafter, the system 10 may receive, at step 72, payment tendered by the participant user(s) and credit the payment to the primary user. In embodiments using one or more user funds cloud(s) 36, the tendered payment may be maintained in a primary user account in the user funds cloud(s) 36. Alternatively, the tendered payment may be transferred directly to a financial services provider 32 designated by the primary user.

Still referring to FIG. 2, if a user of the system 10 is instead participating as a participant user, the user would simply await an invitation to join an event created by a primary user. Upon receipt of an invitation at step 74, the user may join the event at step 76. Upon receipt of a payment request issued by system 10 (e.g., at step 78), the participant user may tender a payment at step 80. Thereafter, system 10 will credit the tendered payment to the primary user. In some embodiments, method 52 may update, at step 82, the debt calculations and/or credit scores. Step 82 may be performed on a periodic basis (e.g., daily), or after payments have been tendered by the participant users.

Various aspects of the disclosed instrumentalities may be better understood by considering example scenarios or use cases. For example, the primary party or user might be a business entity that charges an entry fee for the business, such as a museum, amusement park, or a nightclub, a coordinator raising funds for a charity, or a worker collecting contributions for a team luncheon. In such instances, the participant parties may include, respectively, customers desiring entry into the museum, amusement park, or nightclub, individuals or business contributing to the charity, or co-workers at the team luncheon. The disclosed instrumentalities allow the primary user to create the event, define the cost associated with the event, and define the various participant users. To participate in the event, the various participant users would then join the event. Thereafter, the disclosed instrumentalities will then send to the various participant users appropriate requests for payments. Payments received from the participant users may then be transferred to the primary user or party. The participant parties may then participate in the event.

Significant advantages of the disclosed instrumentalities are associated with the concept of an event. As used herein, an event is any occasion that requires a transaction between multiple participants or individuals. The disclosed instrumentalities allow the primary user or party (e.g., an event organizer or any individual bearing the initial costs associated with the event), to create an event on system 10. The primary party may choose the types of information that will be available to the other participants in the event. The participant users receive payment requests from system 10 in accordance with the event and event costs defined by the primary party. Payments made by the participant users or parties are then transferred to the primary party via the user funds cloud(s) 36 or a financial services provider(s) 32 designated by the primary party.

The disclosed instrumentalities allow the primary party to readily determine who has paid and who hasn't, offering increased clarity and convenience over currently known payment platforms. Consequently, the event concept used by the disclosed instrumentalities is not just about making a payment. It is about facilitating payments for an entire event with multiple participants. The primary party has ownership or management over the event and sets the terms of the transaction or transactions among the participants, thereby organizing the flow of money or funds between the parties or participants in the event.

Other advantages are associated with the credit scoring system. For example, the disclosed instrumentalities may cause to be displayed on the various user communications devices 18 (e.g., under a user profile tab) an indication of the user's credit score. The credit score may be based on the payment history of the user, although other factors may be used as well, as will be described in further detail herein. In some embodiments, the systems and methods may assign a color, such as red, yellow, or green, to the credit score indication. The use of the credit score encourages users to make prompt payments and also gives users an idea of the payment reliability of other users.

Further advantages are associated with the team creation function. The team creation function can be advantageous for users who frequently transact with the same group of people or users. The creation of a team allows users to easily manage recurring transactions within that group, thereby reducing the time and complexity of managing multiple individual transactions. The team creation function also improves the performance of system 10 (e.g., by reducing the amount of data required to be exchanged among the various devices and speeding operation).

Still other advantages are associated with the debt calculation and debt simplification algorithms. For example, the debt calculation algorithm may be used to calculate net balances of users, thereby ensuring user payments are cross-referenced with user expenditures across all events. The debt simplification algorithm calculates or determines the simplest way to settle debts among the participants s in order to minimize the number of transactions and ensure that payments are efficiently made, again improving the performance of system 10.

Still yet other advantages are associated with the OCR module. If used to scan a QR code, OCR module allows participant users to easily join events without requiring the primary user (e.g., the operator of a museum, amusement park, or nightclub) to separately contact the participant users, who, in such instances, would typically be unknown in advance to the primary. A suitable designation or code (e.g., a QR code) may be provided on an entrance sign to the business. A participant user could then obtain a digital image of the designation or code (e.g., via a camera provided on the user communication device). The OCR module would then automatically send an event invitation to the user without requiring further user input.

In sum, the disclosed instrumentalities solve specific and common problems associated with conventional electronic network-based peer-to-peer payment allocation systems and methods. It is the specific implementations for creating and using an event-based payment allocation system that operates differently than conventional methods and solves various problems associated with existing electronic network-based peer-to-peer payment allocation systems.

Having briefly described the systems and methods of the disclosed instrumentalities, as well as some of their more significant features and advantages, various exemplary embodiments of disclosed instrumentalities will now be described in detail. However, before proceeding with the description, it should be noted that while various embodiments of the disclosed instrumentalities are shown and described herein as they could be used in conjunction with various example scenarios described herein, the disclosed instrumentalities could be used in conjunction with any of a wide range of other scenarios, as would become apparent to persons having ordinary skill in the art after having become familiar with the teachings provided herein. Consequently, the disclosed instrumentalities should not be regarded as limited to the particular applications and scenarios described herein.

Referring back now to FIG. 1, one embodiment of the event-based payment processing system 10 may comprise at least one application server 12. Application server(s) 12 may comprise one or more processors and one or more memory systems 30. Application server(s) 12 may be operatively associated with one or more networks 14, such as the Internet.

System 10 may also include a payment allocation application 16. A portion of payment allocation application 16, also referred to herein as an administrative portion 15, may be provided on application server(s) 12, such as on memory system(s) 30 of application server(s) 12. Other portions, i.e., client or user portions 17, of payment allocation application 16 may be provided on corresponding user communications devices 18 available to a plurality of users or parties.

User communications devices 18 may comprise any of a wide range of communications devices suitable for communicating with network 14 and may include, for example, smart phones, tablet computers, laptop computers, desktop computers, and the like. Each user communications device 18 may comprise one or more processors 20, one or more memory systems 22, and one or more user interface systems 24. The user portion 17 of payment allocation application 16 may be stored in memory system 22. User interface system 24 allows the user or party of user communications device 18 to interact or interface with payment allocation application 16. In some embodiments, the user interface system 24 may comprise a touch screen display 26, although other types of user interface systems now known in the art or that may be developed in the future could be used as well. When launched or activated by a user, user communications device 18 is operatively connected to application server(s) 12 via network(s) 14. More specifically, and depending on the particular configuration of system 10, in some embodiments, when launched or activated by the user or party, user portion 17 of payment allocation system 16 is operatively connected to administrative portion 15 of payment allocation application 16 provided on application server 12.

As is known, user communications devices 18 may also be provided with one or more auxiliary systems, such as one or more camera systems, microphone systems, and speaker systems, that may be used by payment allocation application 16 to achieve certain functionalities described herein. However, since user communications devices 18 are well-known in the art and readily commercially available, the particular user communications devices that may be used in conjunction with the disclosed instrumentalities will not be described in further detail herein.

In some embodiments, system 10 may also be operatively associated with one or more financial services providers 32. Financial service provider(s) 32 may include one or more businesses or entities that configure, offer, provide, and/or manage financial service accounts, such as credit card accounts, debit card accounts, checking accounts, savings accounts, loyalty accounts, loan accounts, and the like. In one aspect, financial service provider(s) 32 may include or be associated with one or more financial service systems 34 that may be configured to perform one or more aspects of the disclosed embodiments. For example, in some instances, financial service system(s) 34 may configure one or more accounts for a user of financial service provider(s) 32. The financial services provider(s) 32 may be used by the various users or parties of system 10 to implement payment transfers in accordance with the disclosed instrumentalities.

System 10 may optionally comprise one or more user funds cloud(s) 36. If provided, user fund cloud(s) 36 may be used to temporarily, or even permanently, store user funds, thereby facilitating aspects of the financial transactions between and among the various users or parties to the system 10 in accordance with the disclosed instrumentalities. For example, in some embodiments, the disclosed instrumentalities handle user funds securely through partner banks or financial services provider(s) 32 and may create one or more user funds clouds 36 that reflect funds or money connected or associated with each user account. Users can choose to leave the funds in the user funds cloud(s) 36 or transfer the funds to a desired financial services provider(s) 32.

As mentioned briefly above, payment processing application 16 may include a plurality of algorithms, engines, and modules which may be implemented by administrative portion 15 of payment processing application 16, by user portion 17 of payment processing application 16, or by combinations thereof.

With reference now specifically to FIG. 2, and in the particular embodiments shown and described herein, payment processing application 16 may include a debt calculation algorithm 38. Debt calculation algorithm 38 may be used to calculate net balances of users, thereby ensuring that user payments are cross-referenced with user expenditures across all events. Debt calculation algorithm 38 may include a data collection function that collects data relating to payments made by each participant as well as the associated expenditures across all sub-events (if any). Such collected data may include information identifying each payer and payee, as well as the associated payment amounts, dates, as well as the identification of the event and any sub-event (referred to herein as "event ID," and "sub-event ID," respectively). Debt calculation algorithm 38 then performs a net balance calculation for each participant. More specifically, for each participant, debt collection algorithm 38 calculates the participant's net balance by subtracting the total expenditures from total payments. This process is performed iteratively for each event and sub-event and then aggregated. Debt calculation algorithm 38 then cross-references payments with expenditures across all events and sub-events to ensure accuracy. In some embodiments, users may be provided with a choice of whether or not they want all events cross-referenced, as cross-referencing of events may lead to uncertainty since amounts would be balanced over multiple unrelated events.

Payment processing application 16 may also include a debt simplification algorithm 40. Debt simplification algorithm 40 calculates or determines the simplest way to settle debts among the participants to minimize the number of transactions and ensure that payments are efficiently made.

In a first step, debt simplification algorithm 40 establishes or creates a table or matrix wherein each participant's debts and credits to every other participant are recorded. The algorithm 40 then performs a net position calculation for each participant. That is, for each participant, the algorithm calculates the net position of each participant (i.e., total owed or total owed to each participant). Debt simplification algorithm 40 then performs a transaction optimization process wherein algorithm 40 identifies the smallest set of transactions that can settle all debts by matching participants with complementary net positions (i.e., one participant owes exactly another participant is owned). For example, if Participant A owes $50 to Participant B, and Participant B owes $50 to Participant C, debt simplification algorithm 40 will suggest or recommend that Participant A pay Participant C directly, thereby eliminating the need for two separate transactions to settle the debt. Algorithm 40 iteratively adjusts the transactions to further minimize the number of payments until the most efficient set is achieved.

Payment processing application 16 may also include an event management module 42. Event management module 42 may be used create and manage events and sub-events desired to be created by the primary participant or user. For simple events, event management module 42 allows the primary user to set up events with details that include, but are not limited to, event name, event description, event category (e.g., food, trips, or rent), event date (e.g., month, day, year), event time, event location, expected number of attendees or participants, whether the event is public or private, participant visibility settings, and specific financial requirements, such as whether an initial or upfront payment is required. In the embodiments shown and described herein, event management module 42 may prompt the primary user to input data relating to the event details. As will be described in greater detail below, example event prompts are illustrated in FIG. 5*c*. After the event has been created, event management module 42 updates the event details as needed, manages guest lists, sends reminders, and makes any adjustments to financial requirements.

For complex events, e.g., events with multiple primary parties, event management module 42 allows each primary to create one or more sub-events under the main event heading or "umbrella." Each sub-event may have its own budget, participant list, and financial transactions. In some embodiments, event management module 42 will permit a primary party of a sub-event to delegate management of the sub-event to one or more other participants. If so, event management module 42 will allow such other delegees to gain administrative control over the particular sub-event.

Payment processing application 16 may also include a credit scoring module 44. As briefly mentioned above, credit scoring module 44 may be used to calculate credit scores for the users. The calculated credit score for each user may be displayed on user interface 24 of user communication device 18. In many embodiments, the credit scores of individual participants will be available (e.g., viewable) by the primary user before the event invitations are sent out to the individual participants, thereby allowing the primary user to make alternative arrangements for potential participant users with low credit scores. Such alternative arrangements could include, but are not limited to, not including the participant on the event invitation, or requiring the participant to pay in advance.

In the particular embodiments shown and described herein, credit scoring module 44 may calculate a user's credit score based on one of three methods or models 61, 63, and 65 (FIG. 3). A first model 61 involves transaction-based scoring. In this first model 61, the users gain or lose points based on the timeliness of their payments. Positive points may be awarded for payments made on the due date. Bonus positive points may be awarded for payment made in advance of the due date. Negative points may be assigned to users for payments made after the due date. The later the payment is made, the more negative points could be assigned. The user's overall credit score would be based on a sum of the positive and negative points. In some embodiments, first model 61 applied by credit scoring module 44 may adjust the weight of points (e.g., positive or negative) based on the frequency of transactions. Frequent users would then have a buffer against occasional late payments.

A second scoring model 63, also referred to herein as a peer review system, prompts users to rate their experiences with other participants after each event. For example, in one embodiment of second model 63, each participant may give a rating of from 1 to 5 stars based on the reliability and interaction of the participant during the event. Credit scoring module 44 would then periodically (e.g., every month) calculate an average score and adjust the user's overall score accordingly. In some embodiments, second scoring model 63 may be provided with a feedback loop in which users with low ratings receive suggestions for improving their scores. High ratings may unlock certain perquisites, such as reduced service fees.

A third scoring model 65 involves community engagement and feedback. In this third scoring model 65, a user's involvement with various aspects of system 10, such as through forums, helpful feedback, and active participation in community polls or events, may be used to enhance a user's credit score. Engagement points may be awarded for each community activity in which the user participates. Feedback quality may also be used to award points. For example, feedback that is 'upvoted' by other uses or acknowledged by system moderators may be used to contribute to the user's score. Event hosting may also be used to increase a user's score. For example, regular event hosts (i.e., primary users) could be awarded additional points for events that meet certain quality standards based on participant feedback.

With reference back now to FIG. 2, payment processing application 16 also may be provided with an OCR (optical character recognition) engine 46. OCR engine 46 may be used to analyze electronic image data captured by a camera or other imaging system associated with user communication device 18. The electronic image data may be of physical media or documents having cost information or codes (e.g., a QR code) provided thereon. The data provided by OCR engine 46 may then be used by payment processing system. OCR engine 46 may be provided via a separate application programming interface (API) of known OCR engines. Alternatively, OCR engine 46 could be provided directly as a custom feature or component of payment processing application 16.

Financial interface module 48 allows payment allocation application 16 to interface with the financial services provider(s) 32 and user funds cloud(s) 36. A communications module 50 allows payment allocation application to interface with the various user communications devices 18 as well as other systems and devices connected to network 14. In the particular embodiments shown and described herein, financial interface module 48 and communications module 50 may comprise one or more APIs.

Payment allocation application 16, e.g., which may include administrative portion 15 and user portion 17, may comprise non-transitory computer-readable program code that causes the system 10 to perform a method 52 (FIG. 3)

to allocate payments between users or parties in accordance with the disclosed instrumentalities. The non-transitory computer-readable program code may be provided on one or more of the memory system(s) 30 of application server(s) 12 as well as on one or more of the memory system(s) 22 of user communications device(s) 18, so that it is accessible to the various processors 20 and 28.

Figure 4:
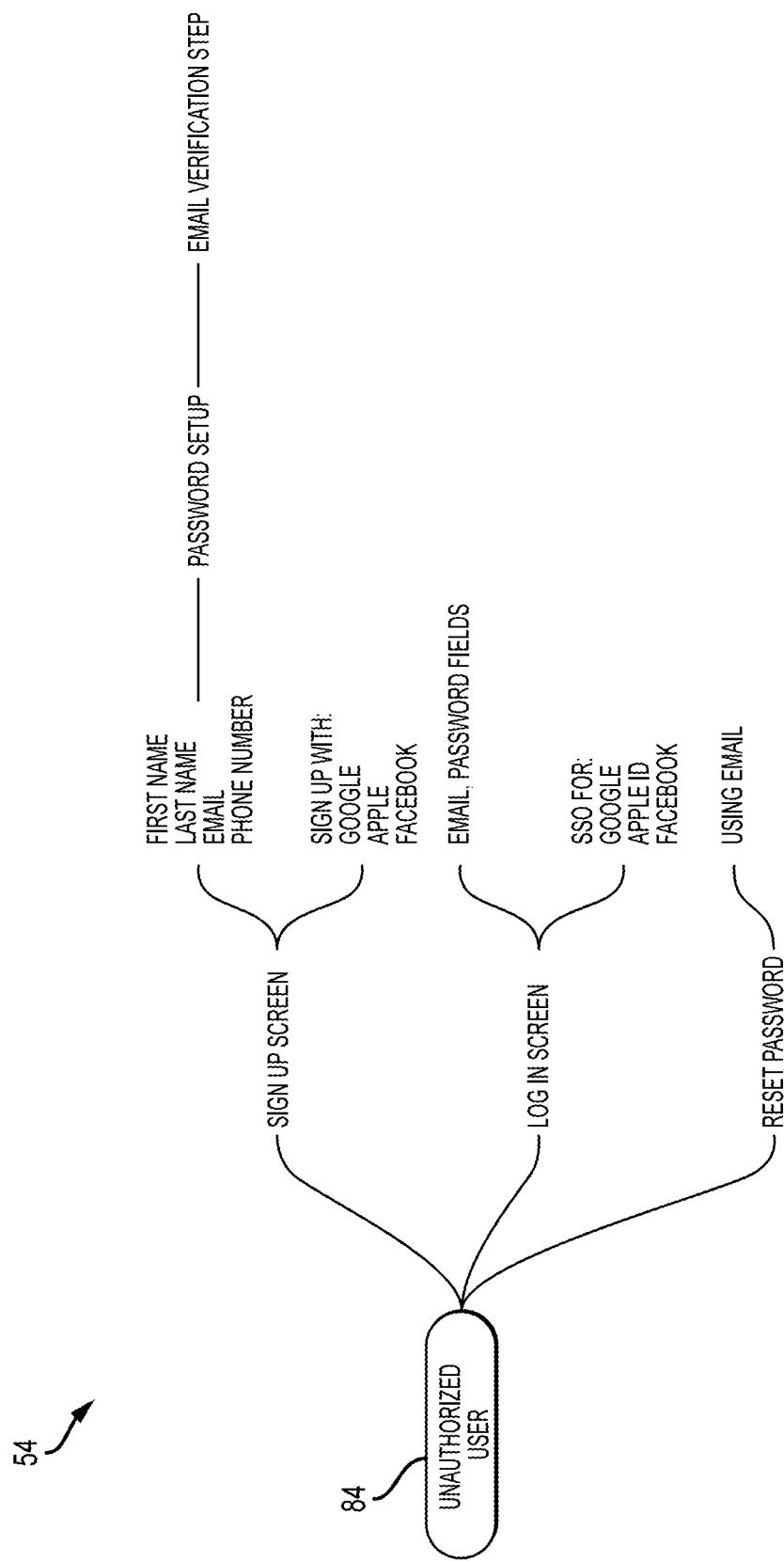
FIG. 4 is an application flow diagram of one embodiment of the account creation step for unauthorized users.
Figure 5B:
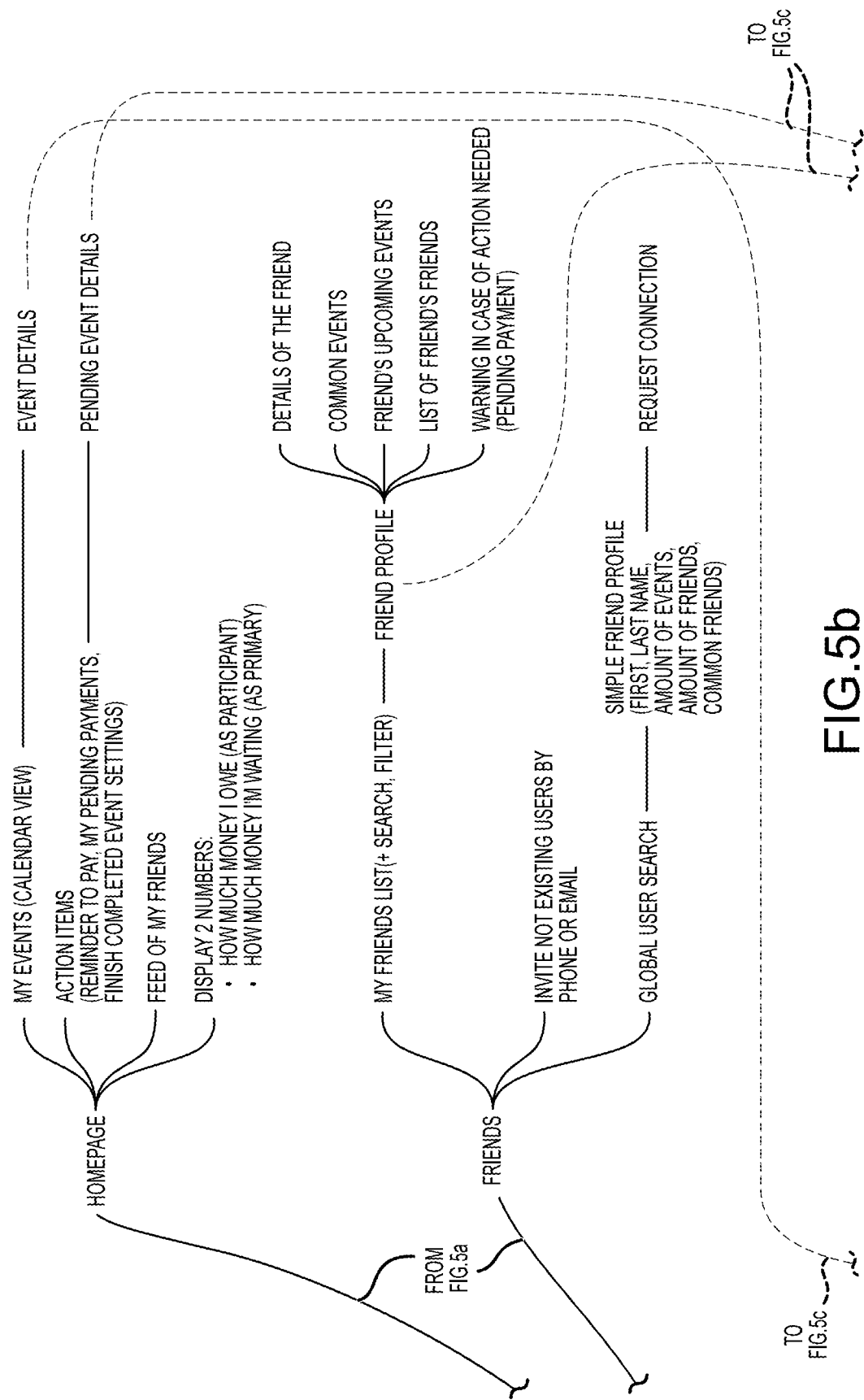
FIGS. 5(a-d) is an application flow diagram of one embodiment of the payment allocation application for authorized users.

Referring now to FIGS. 3 and 4 simultaneously, method 52 may involve at step 54 the creation of a user account. Creation of a user account transforms an unauthorized user 84 (FIG. 4) into an authorized user 86 (FIGS. 5*a*-*c*). Each individual user, whether subsequently designated as a primary user, a secondary user or manager, or a participant user, must first create a user account. System 10 and method 52 may then prompt the user (e.g., via user interface 24 of user communication device 18) to provide certain information and data required to create an account. An example of the prompts and program flow associated with account creation step 54 is depicted in the program flow illustrated in FIG. 4.

Before proceeding with the description of method 52, it should be noted that the disclosed instrumentalities may be configured to cause to be displayed on user interface 24 of user communications device 18 one or more of the following function headings or 'tabs' to allow a user to more easily navigate the features, functions, and options of system 10:

Homepage:
  Serves as a dashboard where user can see an overview of his or her account.
  An example of the prompts and program flow associated with the Homepage tab is depicted in the program flow illustrated in FIG. 5*b*.

Events:
  Allows the user to create, manage, and join events. It may display the list of current and past events of the user. In some embodiments there are 3 settings or categories for events: Upcoming, Pending (i.e., event occurred and now waiting on payments finalized), and Completed (i.e., event occurred and payments finalized).
  An example of the prompts and program flow associated with the Events tab is depicted in the program flow illustrated in FIG. 5*c*.

Teams:
  Allows the user to create, manage, or join a team or teams. It may display a list of teams of which the user is a part.
  An example of the prompts and program flow associated with the Teams tab is depicted in the program flow illustrated in FIG. 5*d*.

Payments:
  Shows the user's transaction history and current payment status on any outstanding balances.
  An example of the prompts and program flow associated with the Payments tab is depicted in the program flow illustrated in FIG. 5*d*.

Friends:
  Allows the user to manage his or her friends list, accept friend requests, or search for new friends to add.
  An example of the prompts and program flow associated with the Friends tab is depicted in the program flow illustrated in FIG. 5*b*.

My Profile:
  Contains the personal account information, payment methods, and account settings of the user. The user's credit score may be displayed here.
  An example of the prompts and program flow associated with the My Profile tab is depicted in the program flow illustrated in FIG. 5*a*.

Notifications:
  Includes event reminders, payment due dates, updates from friends or teams, etc. In some embodiments, the Notifications tab may be divided or split into two sub-tabs: "Chats" and "Payments." The Chat sub-tab is the event-specific chat room for events. The Payments sub-tab notifies users of upcoming payments, payment updates from participants, event invites, etc.
  An example of the prompts and program flow associated with the Notifications tab is depicted in the program flow illustrated in FIG. 5*a*.

Chat:
  Allows users to chat with one another. Types of chats include team chats and private chats. Notifications and new messages may also be provided via the Chat function. Direct messaging may not be available. Chats are for teams and event blocks.
  An example of the prompts and program flow associated with the Chat tab is depicted in the program flow illustrated in FIG. 5*a*.

Analytics:
  Allows users to obtain a wide range of information about aspects of their use of the system, including details relating to events, costs, payments, balances, time frames, etc.
  An example of the prompts and program flow associated with the Analytics tab is depicted in the program flow illustrated in FIG. 5*a*.

Help & Support:
  Dedicated to user support, including FAQs and customer service contacts. It may also allow the user to interface with a 'chatbot' to handle common inquiries.

Continuing now with the description of method 52, once a user has created a user account at step 54 (FIGS. 3 and 4) and has become an authorized user 84 (FIGS. 5*a*-*d*), system 10 and method 52 may then prompt the user (e.g., via the user interface 24 provided on the user communication device 18) to create, at step 56, a link to one or more financial services providers 32. The link may be accomplished in whole or in part by financial interface module 48 (FIG. 2) based on financial and other identification information provided by the user. So linking to a financial services provider(s) 32 facilitates the tender and receipt of payments via the system 10. The user may manage the linked financial services providers via the "My Profile" tab, example prompts and program flow of which are depicted in FIG. 5*a*. If desired, the user may also create one or more teams at step 58 via the "Teams" tab, FIG. 5*d*. Alternatively, a user may create a team at any time.

In some embodiments, system 10 may develop a credit score for the user at step 60. The credit score may be developed in whole or in part by credit scoring module 44 and may be based at least in part on the personal and financial information provided by the user during the account creation step 54. Alternatively or in addition, payment processing application 12 may develop and/or revise the credit score on a periodic basis or after the user has interacted with system 10 as either a primary user or a participant user. The calculated credit score for each user may then be displayed on the user interface 24 of user communication device 18. In most instances, the credit scores of individual participants will be available (e.g., viewable) by the primary user before the event invitations are sent out to the individual participants, thereby allowing the primary user to make alternative arrangements for potential participant users with low credit scores. For example, such alternative arrangements could include, but are not limited to, not including the participant on the event invitation, or requiring the participant to pay in advance. As mentioned earlier, credit scoring module 44 may calculate a user's credit score based on one of three methods or models 61, 63, and 65.

In any event, and regardless of if and when a credit score have been developed at step 60, a user may make a request at step 62 to be designated or assigned as a primary user. A primary user is a user that creates an event and bears the initial costs associated with the event, whereas a participant user is a user that participates in an event. However, it should be noted that a user may participate in a created event as a primary user, a secondary user, or a participant user. If the user desires to be a primary user or party, the user would make the appropriate request (i.e., at step 62) via the user interface 24 of user communication device 18. Upon receipt of the request, the system 10 would then assign as a primary user the user that made the request.

Having been designated as a primary user, i.e., at step 62, system 10 would prompt the primary user to create an event at step 64. The creation and subsequent management of the event may be accomplished in whole or in part by event management module 42 (FIG. 2) and by interacting with the "Events" tab. Example prompts and program flow associated with the "Events" tab are depicted in FIG. 5c.

In order to create an event, the primary user would interface with payment allocation application 16, e.g., via user interface 24 of user communication device 18. In some embodiments, the primary user may also assign or appoint a secondary user or manager at step 66 to assist in managing the event. Event management module 42 of payment processing application 16 may be used to assist the secondary user or manager in managing the event.

In some embodiments, e.g., wherein the created event involves several different aspects or components, the primary user may also create one or more sub-events at step 67. Each sub-event may be a subset of the main event, but with its own budget, participant list, and financial transactions. The creation at step 67 of one or more sub-events may also be performed for complex events having multiple primary users. One or more of the multiple primary users could create one or more sub-events to streamline event payment and management functions. In some embodiments, sub-events could be delegated to other participants would then be assigned administrative control over the delegated sub-event.

After the primary user has created the event (and any desired sub-events), the primary user may then, at step 68, designate participant users for the event. If the participant users in the event were previously defined as a team (e.g., at step 58), the primary user may simply designate the team for the event. Then, each member of the team will be a participant user. If no team has yet been created for the designated participant users, then system 10 may allow the primary user to create a team for the defined event at step 68.

Step 88 determines the cost of the event (and any sub-events) and apportions those costs among the various participants. In some embodiments the event costs may be known in advance, in which case the primary user could determine the amount payable by each participant in advance based on the known event cost. However, in other embodiments, the event cost may not be known until after the event, in which case the amount payable by each participant would not be known until during or even after the event. Still other embodiments may involve a combination of the two: Some event costs may be known in advance, while others will not be known until incurred during or even after the event.

In some instances, the event costs may be made available to the primary user in the form of printed matter or paper receipts. If so, method 52 may proceed to step 90 in which payment processing application 16 may use OCR engine 46 to perform optical character recognition (OCR) on image data of the printed matter or paper receipt in order to determine the event cost, or at least the cost shown on the printed matter or paper receipt. In such an embodiment, the primary user may use a camera (not shown) associated with the user communication device 18 to capture the desired image and produce the image data. The user portion 17 of payment processing application 16 would then access OCR engine 46 to perform optical character recognition on the image data. The payment processing application 16 would then associate the recognized cost to the event.

In still other instances, all or a portion of the event cost may be available via a machine-readable code, such as a QR code. For example, such a machine-readable code could be posted on a sign at an entrance to a venue, such as a museum, amusement park, or nightclub. A user could then scan the QR code with his or her user communication device 18. The payment processing application 16 would then associate the appropriate event cost to the participant user.

In a next step 92, debt calculation algorithm 38 (FIG. 2) may be used to calculate the total cost of the event and apportion that cost among the various event participants. In some embodiments, debt calculation 38 algorithm may be used automatically (e.g., on a periodic basis) by payment processing application 16 to update the accounts (e.g., at step 82) of each user. In other embodiments, individual users (e.g., either primary users or participant users) may invoke debt calculation algorithm 38 manually in order to update to their accounts. As described above, debt calculation algorithm 38 may be used to calculate net balances of users, thereby ensuring that user payments are cross-referenced with user expenditures across all events and sub-events (if any). Debt calculation algorithm 38 collects data relating to payments made by each participant as well as the associated expenditures across all events and sub-events. Debt calculation algorithm 38 then performs a net balance calculation for each participant. Debt calculation algorithm 38 then cross-references payments with expenditures across all events and sub-events to ensure accuracy.

Debt simplification algorithm 40 may also be used in conjunction with step 88, e.g., at step 93. As described above, debt simplification algorithm 40 calculates or determines the simplest way to settle debts among the participants in order to minimize the number of transactions and ensure that payments are efficiently made.

Figure 5D:
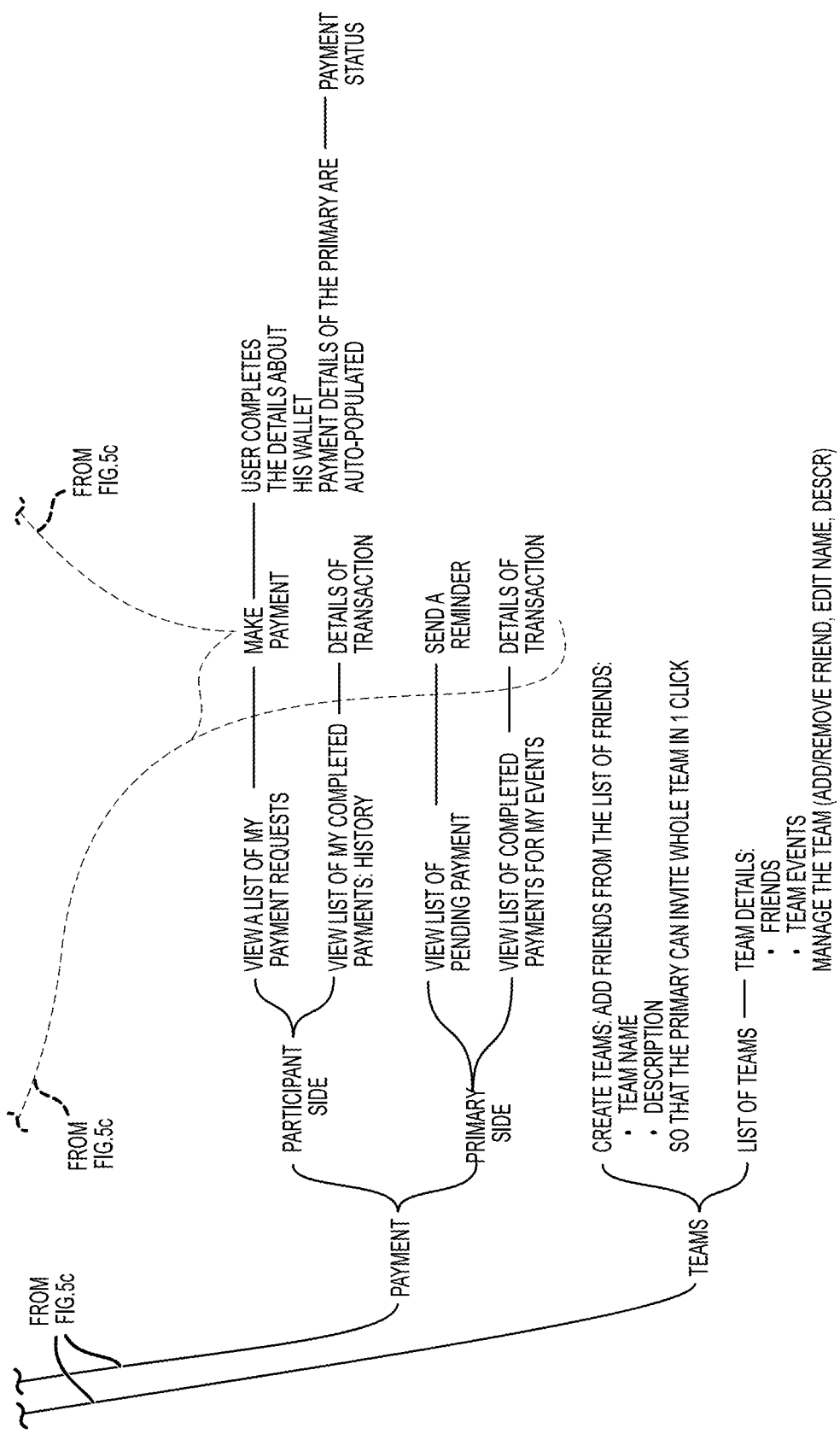

Once the costs for the event have been determined and apportioned, the system 10 may then, at step 70, transmit or send payment requests to each of the designated participant users, whether they be individual designees or part of a defined team. The payment requests would then be displayed on user interface 24 of user communications device 18 for each respective event participant. Thereafter, the system 10 may receive, at step 72, payment tendered by the participant user(s) and credit the payment to the primary user. Payments made by both the participant and primary users may be made by interacting with the "Payments" tab which may be provided on user interface 24 of user communication device 18. Example prompts and program flow associated with the "Payments" tab are depicted in FIG. 5d. In embodiments having a user funds cloud(s) 36, the tendered payment may be maintained in a primary user account in the user funds cloud(s) 36. Alternatively, the tendered payment may be transferred to a financial services provider 32 designated by the primary user. Additional payment requests may be transmitted from time-to-time until the user has tendered all payments required for the event.

If a user of the system 10 is instead participating as a participant user, the user would simply await an invitation to join an event created by a primary user. Various details about events may be accessed via the "Events" tab which may be provided on user interface 24 of user communication device 18. Again, example prompts and program flow associated with the Events tab are depicted in FIG. 5c. Upon receipt of an invitation at step 74, the user may join the event at step 76. In this regard it should be noted that in some embodiments, the event created by the primary user could be an open invitation to the general public, such as if the primary user is the operator of a museum, amusement park, or nightclub. In such an embodiment, the user would become a participant user by simply accepting the invitation. For example, the participant user may join the event by scanning a QR code provided on physical media or by following a hyperlink provided by the primary user. Upon receipt of a payment request issued by system 10 (e.g., at step 78), the participant user may tender a payment at step 80. Thereafter, system 10 will credit the tendered payment to the primary user. In some embodiments, method 52 may update, at step 82, the debt calculations and/or credit scores. Step 82 may be performed on a periodic basis (e.g., daily), or after payments have been tendered by the participant users. Again, payments made on both the participant user side and the primary user side may be made by interacting with the "Payments" tab which may be provided on the user interface 24 of user communication device 18. Example prompts and program flow associated with the "Payments" tab are depicted in FIG. 5d.

After all payments are finalized and completed, the event status may be changed to "completed." For the primary user, once all payments are finalized, the event status is completed. For a participant user, once that participant user completes payment, the event status becomes completed. All completed event blocks then update to the user's analytics and organizes the payments/event details.

Payment processing application 16 may be provided with additional features and functions. For example, some embodiments of payment processing application 16 may be provided with an "Analytics" tab, which may be provided on the user interface 24 of user communications device 18. Example prompts and program flow associated with the "Analytics" tab are depicted in FIG. 5a. Information and data available on the Analytics tab may include data relating to expenses, events, dates, time frames, etc. The information may be provided and/or filtered by user, primary user, participant user, and teams, for example. The information may be provided in any of a wide range of tabular or graphical forms, including charts and graphs.

Payment processing application 16 may also be provided with a "Notifications" tab to allow a user to provide or respond to notifications, either generated by the system or by other users. A "Chat" tab may also be provided to allow users to conveniently communicate with one another regarding events, teams, and other aspects of payment processing application 16. Example prompts and program flows that may be available via the "Notifications" and "Chat" tabs are depicted in FIG. 5a. Some embodiments of payment processing application 16 may also be provided with a "Friends" tab to allow users to readily identify friends and colleagues, either to invite them to events or otherwise. Example prompts and program flows that may be available via the "Friends" tab are depicted in FIG. 5b.

EXAMPLES

As described above, the disclosed systems and methods may be used in a wide range of situations and circumstances, such as, for example:

Social Gatherings

Organizing a birthday party where costs for venue, food, and entertainment need to be split among attendees.

Corporate Events

Managing a conference where multiple workshops occur simultaneously-participants can choose which to attend and pay accordingly.

Informal Group Activities

A group of friends planning a weekend getaway, wherein it is desirable to budget and track expenses for lodging, travel, and activities.

Community Fundraisers

Local communities organizing events for charity, where tracking donations and expenditures is important for transparency.

Specific Example 1—Dinner at a Local Restaurant

After a movie, Josh and his friends decide to grab dinner at a local kitchen. The bill needs to be split among the group. At the restaurant, Josh quickly creates an event titled "Friday Dinner" and adds his friends as participants. After Josh pays for the dinner, he scans the receipt using the OCR feature. The payment processing application 16 itemizes the receipt, and Josh assigns items to each friend based on what they ordered. Each friend the receives a request for their specific share. They review and complete the payment via payment processing application 16.

Specific Example 2—Group Trip to Mexico and Dinner with Friends

A group of five friends-Josh, Kyle, Jonathan, Matthew, and Max-organize a week-long trip to Mexico. The trip includes multiple planned activities, including dinners, golf, a guided tour, and accommodations. Each activity is managed as a sub-event under the main event "Mexico Trip" created by the primary user, Josh.

Event Setup and Management

Main Event Creation:

Josh creates the "Mexico Trip" event and invites Kyle, Jonathan, Matthew, and Max to join the event. Josh sets the overall budget and links a shared trip document with details and schedules.

Sub-Event Setup:

Dinner Night 1: Max volunteers to handle this and creates the sub-event. He inputs the estimated cost and the participants.

Golf Day 2: Jonathan takes responsibility and sets up this sub-event, listing fees and equipment rental costs.

Guided Tour Day 3: Kyle organizes and lists entry fees and transportation costs.

Hotel Stay: Josh handles the accommodation costs, splitting the total among everyone for the duration of the stay.

Financial Transactions and Management
Payment Collection and Reconciliation:

Each sub-event primary pays upfront for the services. For example, Max pays the restaurant bill, Jonathan covers the golf fees, and Kyle pays for the guided tour.

After each payment, the primaries use payment processing application 16 to scan receipts and input the actual costs. The application 16 itemizes these receipts, and the primaries assign expenses to each participant based on their usage or consumption.

Automatic Debt Calculations:

Payment processing application 16 calculates individual shares for each sub-event and automatically updates each participant's balance.

If Kyle paid extra for the taxi during the guided tour, payment processing application 16 adjusts his total owed amount and reflects this in the overall trip accounting.

Payment processing application 16 adjusts and calculates net balances, ensuring that each person's payments are cross-referenced with their expenditures across all sub-events.

Settlement of Balances:

At the end of the trip, payment processing application 16 provides a comprehensive breakdown of who owes whom and how much, considering all sub-event transactions. For example:

If Max paid more overall during the trip but owes less based on his participation in sub-events, those who owe him will see automated payment requests corresponding to their share.

Payment processing application 16 suggests the simplest set of transactions to settle all debts, minimizing the number of transfers each person must make. For example, instead of multiple small reimbursements, payment processing application 16 may suggest a single payment from Jonathan to Max that covers various small debts across different sub-events.

Unless defined otherwise, all technical and scientific terms used herein have the same meaning as commonly understood by persons having ordinary skill in the art to which the invention pertains. Although any systems, methods, and materials similar or equivalent to those described herein can be used in practice for testing of the present invention, the preferred systems, methods, and materials are described herein.

In understanding the scope of the present invention, the articles "a" and "an" are used herein to refer to one or to more than one (i.e., to at least one) of the grammatical object of the article. By way of example, "an element" means one element or more than one element. The term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including," "having" and their derivatives. Any terms of degree such as "substantially," "about" and "approximate" as used herein mean a reasonable amount of deviation of the modified term such that the end result is not significantly changed. When referring to a measurable value, such as an amount, a temporal duration, and the like, these terms are meant to encompass variations of at least ±20% or ±10%, more preferably ±5%, even more preferably ±1%, and still more preferably ±0.1% from the specified value, as such variations are appropriate and as would be understood by persons having ordinary skill in the art to which the invention pertains.

Throughout this disclosure, various aspects of the invention may be presented in a range format. It should be understood that the description in a range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.6, 3, 4, 5, 5.7, and 6. This applies regardless of the breadth of the range.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adapted to another embodiment. It should be noted that while the present invention is shown and described herein as it could be used in conjunction with a configuration of various components, it could be utilized with other configurations, either now known in the art or that may be developed in the future, so long as the objects and features of the invention are achieved, as would become apparent to persons having ordinary skill in the art after having become familiar with the teachings provided herein. Consequently, the present invention should not be regarded as limited to that shown and described herein. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. An event-based payment processing system, comprising:
 an application server that operates within a network;
 a memory that stores program instructions and data within the application server;
 a plurality of payment allocation applications that are stored within memory on corresponding user communications devices of a plurality of users, wherein at least some of said plurality of payment allocation applications are in network communication with said application server via the user communications devices connected to the network; and
 wherein said application server and each of said plurality of payment allocation applications having with program instructions stored within the application server memory thereon, when executed, cause said application server to:

select a primary user from one of the plurality of users in response to a request transmitted by one of the user communications devices;

create an event in response to an event creation request transmitted by the user communications device of the primary user;

select participant users from a selected plurality of users in response to participant user selection data transmitted by the user communications device of the primary user;

transmit a payment request to the user communications device of each participant user based on event cost data transmitted by the user communications device of the primary user; and receive a payment from at least one participant user, the payment commensurate with the transmitted payment request.

2. The system of claim 1, wherein said application server executes the program instructions to transmit to the user communications device of each participant user an invitation to join the event.

3. The system of claim 1, wherein said application server executes the program instructions to transfer the received payment to a financial service provider designated by the primary user.

4. The system of claim 1, wherein said application server executes the program instructions to create a team of users based on team creation signals transmitted by one of the user communications devices and wherein said application server executes the program instructions to assign each individual of the team of users to be one of a primary user or a participant user based on signals transmitted by one of the user communications devices.

5. The system of claim 4, wherein said application server executes the program instructions to create the team of users from a subset of the plurality users of the payment allocation applications.

6. The system of claim 1, wherein said application server executes the program instructions to track payments received from the participant users and transmit to the user communications device of the primary user signals indicative of payments received from the participant users.

7. The system of claim 1, wherein said application server executes the program instructions to generate a credit score for at least some of the plurality users.

8. The system of claim 1, wherein said application server executes the program instructions to establish at least one payment term selected from the group consisting of a payback period and number of payments.

9. The system of claim 1, wherein said application server executes the program instructions to establish an account for each of the plurality of users.

10. The system of claim 9, wherein said application server executes the program instructions to provide personal information and financial information for each established user account.

11. The system of claim 10, wherein said application server executes the program instructions to generate a credit score for at least some of the plurality of users based on at least one of the personal information, the financial information, and a previous payment history.

12. The system of claim 11, wherein said application server executes the program instructions transmit the generated credit score to the user communications device of another user.

13. The system of claim 12, wherein said application server executes the program instructions to assign a color to the credit score transmitted to the user communications device of another user, the assigned color being selected from the group consisting of a color green, a color yellow, and a color red.

14. The system of claim 1, wherein said application server executes the program instructions to cause the user communications devices to display a plurality of function tabs.

15. The system of claim 14, wherein the displayed function tabs are selected from the group consisting of an Events tab, a Teams tab, a Transactions tab, a Friends tab, a Profile tab, a Notifications tab, and a Help & Support tab.

16. A method, comprising:

including an application server operatively connected to a network;

including a plurality of payment allocation applications, the plurality of payment allocation applications stored on corresponding user communications devices of a plurality of users;

receiving, at the application server, via a first payment allocation application stored on a first user communication device, a request by a user to be selected a primary user;

receiving, at the application server, via the first payment allocation application, a request to create an event from the selected primary user;

generating, by the application server, data relating to the created event;

receiving, at the application server, via the first payment allocation application, selections of participant users;

receiving, at the application server, via the first payment allocation application, data relating to the cost of the created event;

transmitting, by the application server, a payment request to the payment allocation application stored on the user communications device of each participant user based on the cost of the created event; and receiving, at the application server, payment from at least one participant user, the payment commensurate with the transmitted payment request.

17. An event-based payment processing system, comprising:

an application server operatively connected to a network, said application server in network communication with a plurality of user communications devices; and a payment allocation application comprising an administrative portion operatively connected to said application server and a user portion operatively stored within a memory of each of the plurality of user communications devices, said payment allocation application further comprising:

a communications module configured to communicate with each of the plurality of user communications devices via the network;

an event management module operatively connected to said communications module, said event management module configured to create an event requested by a primary user, the created event executing a transaction between multiple users, said event management module configured to select a plurality of event participants selected, said communications module configured to operate said communications module that transmits event invitations to each of the event participants;

a debt calculation algorithm configured to apportion a total cost of the created event among the event participants;

a debt simplification algorithm configured to process net balances of the event participants and the apportioned total cost and determine payment allocations among the event participants and minimize the number of transactions among the event participants and obtain a zero net balance for each event participant; and a financial interface module linked to at least one financial services provider, said financial interface module configured to, via said communications module, transmit payment requests to the event participants, the payment requests based on the payment allocations determined by said debt simplification algorithm, and credit tendered payments to other event participants.

18. The system of claim 17, wherein said payment allocation application further comprises a credit scoring module configured to calculate user credit scores.

19. The system of claim 18, wherein the user credit scores calculated by said credit scoring module comprise one or more from the group consisting of transaction-based scoring; peer review based scoring, and community engagement and feedback scoring.

20. The system of claim 17, wherein said payment allocation application further comprises an OCR engine configured to analyze electronic image data received from at least one of the plurality of user communications devices.

21. The system of 17, wherein said event management module is configured to prompt the primary user to input data relating to the event.

22. The system of claim 17, wherein said event management module is configured to create a sub-event related to the created event.

23. The system of claim 19, wherein said event management module is configured to allow a delegee selected by the primary user to gain administrative control over the created sub-event.

24. A network-based method of allocating payments among users, comprising:
including a payment allocation application having an administrative portion operatively connected to an application server and a user portion operatively connected to each of a plurality of user communications devices in network communication with the application server, the payment allocation application further comprising:

a communications module configured to communicate with each of the plurality of user communications devices via the network;

an event management module that operates within the application server, and is connected to said communications module, said event management module configured to create an event requested by a primary user, the created event executing a transaction between multiple users, said event management module configured to select a plurality of event participants selected by the primary user, said communications module configured to operate said communications module and transmit event invitations to each of the event participants;

a debt calculation algorithm configured to apportion a total cost of the created event among the event participants;

a debt simplification algorithm configured to process net balances of the event participants and the apportioned total cost and determine payment allocations among the event participants and minimize the number of transactions among the event participants and obtain a zero net balance for each event participant; and a financial interface module connected to at least one financial services provider, said financial interface module configured to, via said communications module, transmit payment requests to the event participants, the payment requests being based on the payment allocations determined by said debt simplification algorithm, and credit tendered payments to other event participants, selecting a primary user in response to a request by a user;

creating, by the event management module, an event in response to a request by the primary user;

defining, by the event management module, a plurality of event participants for the created event in response to a designation by the primary user;

determining a total cost for the created event;

apportioning, by the debt calculation algorithm, the total cost for the created event among the event participants;

processing, by the debt simplification algorithm, net balances of the event participants and the apportioned total cost and determine payment allocations among the event participants and minimize the number of transactions among the event participants and obtain a zero net balance for each event participant;

sending, by the communications module, payment requests to the event participants, the payment requests based on the determined payment allocations; and crediting, by the financial interface module, tendered payments to other event participants.

\* \* \* \* \*